(12) United States Patent
Senior et al.

(10) Patent No.: US 6,933,954 B2
(45) Date of Patent: Aug. 23, 2005

(54) ASPECT RATIO CONVERSION OF VIDEO CONTENT

(75) Inventors: Jay Senior, Seattle, WA (US); Stephen J. Estrop, Carnation, WA (US)

(73) Assignee: Microsoft Corporation, Redmond, WA (US)

(*) Notice: Subject to any disclaimer, the term of this patent is extended or adjusted under 35 U.S.C. 154(b) by 89 days.

(21) Appl. No.: 10/699,325

(22) Filed: Oct. 31, 2003

(65) Prior Publication Data

US 2005/0093893 A1 May 5, 2005

(51) Int. Cl.[7] .............................................. H04N 1/46
(52) U.S. Cl. ................................... 345/660; 348/426.1
(58) Field of Search ............................... 345/660, 600; 348/426.1; 382/133

(56) References Cited

U.S. PATENT DOCUMENTS 6,011,566 A * 1/2000 Salamon ..................... 345/600
6,157,389 A * 12/2000 Knowlton .................... 345/660
2004/0252875 A1 * 12/2004 Crandall et al. ............. 382/133

OTHER PUBLICATIONS

"Getting from 4:3 to 16:9", *Broadcast Engineering*, Jun. 1, 2001, http://articles.findarticles.com, 4 pages.
Schiller, R. et al., "Aspect Ration Conversion", *Broadcast Engineering*, Sep. 1, 2002, http://articles.findarticles.com, 3 pages.

* cited by examiner

*Primary Examiner*—Almis R. Jankus
*Assistant Examiner*—Jon Hadidi
(74) *Attorney, Agent, or Firm*—Woodcock Washburn LLP (57) ABSTRACT

An image of a first aspect ratio is modified to be displayed in a display area with a second aspect ratio. In doing so, the aspect ratio of some of the image content is approximately maintained, yet the aspect ratio of other areas of the image content is stretched so that the entire resulting image fills the display area. This may be done by either using texture mapping to map a strip of content (treated as a texture) into a strip of the destination image. It may also be done by modifying the image content to an intermediate image, which is then uniformly stretched to fill the intended aspect ratio. The areas of image content closest to one or more focus areas is approximately maintained, while other areas are allowed more distortion.

20 Claims, 13 Drawing Sheets

Widescreen Display
10

ASPECT RATIO CONVERSION OF VIDEO CONTENT

FIELD OF THE INVENTION

This invention relates in general to the field of video content. More particularly, this invention relates to the conversion of video content from a first aspect ratio to a second aspect ratio for display.

BACKGROUND OF THE INVENTION

Video content is generally associated with an aspect ratio. This aspect ratio is the intended ratio between the width and the height of a display area in which the video content will be displayed. Aspect ratios are given in the form width: height. For example, until recently, televisions have generally had a display area with an aspect ratio of 4:3, that is to say, the height of the screen is 75% of the width of the screen. This is known as a "full screen" or "standard definition" aspect ratio. Widescreen displays are also available. The width of a widescreen television with a display area of a certain height is greater than the width of a standard display area for that certain height. Thus, a widescreen aspect ratio will be higher than a standard display area aspect ratio. A typical widescreen aspect ratio is 16:9. While widescreen displays are becoming more prevalent, much existing content (for example, broadcast television) is in a standard aspect ratio of 4:3 or another aspect ratio.

Figure 1:
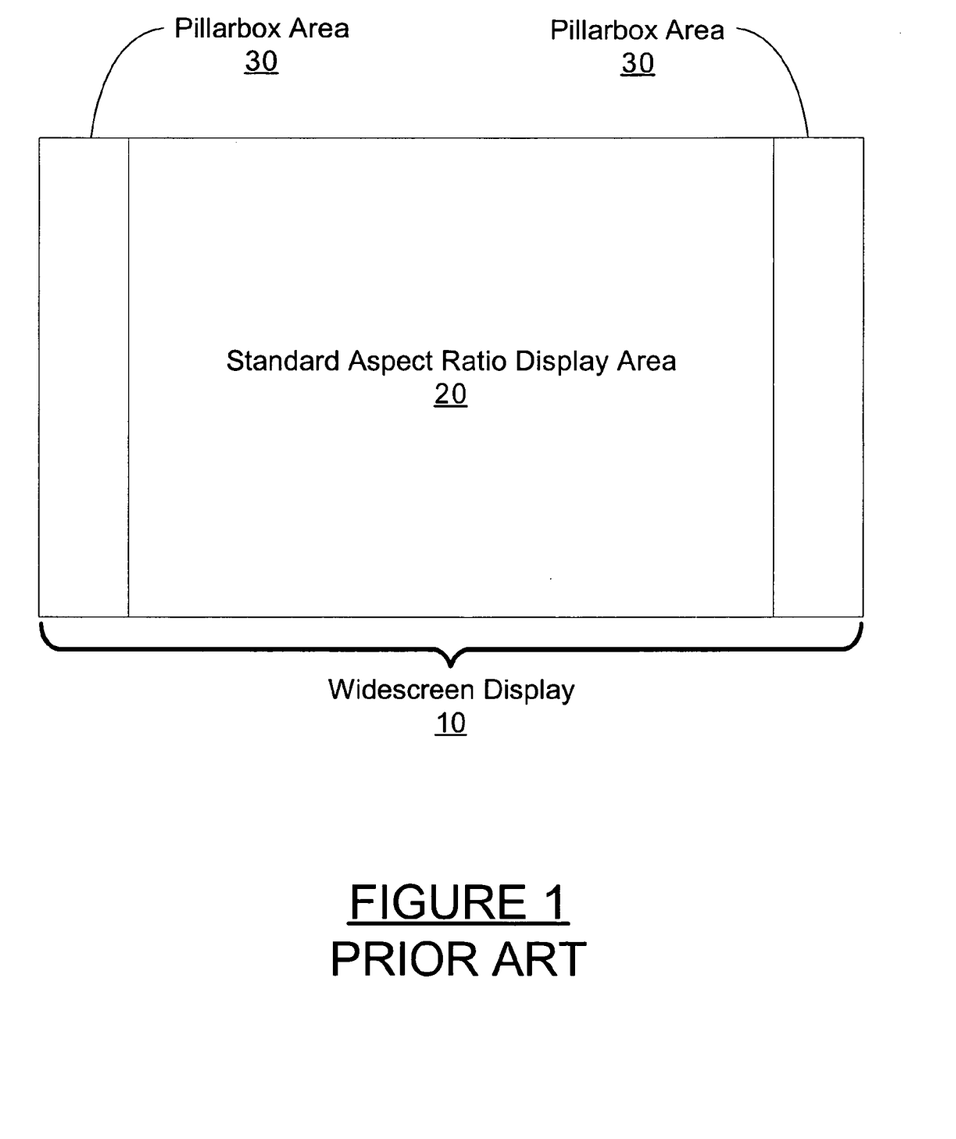
FIG. 1 is a block diagram of the prior art pillarboxing technique for displaying video content of one aspect ratio on a display with a second, higher aspect ratio.

A problem occurs when content of one aspect ratio is to be displayed in a display area of a different aspect ratio. In order to display content of a certain aspect ratio on a display with a higher aspect ratio (e.g., to display content of a standard aspect ratio on a widescreen display), a technique known as pillarboxing is used. In the pillarboxing technique, the content is displayed on the widescreen display using the entire height of the widescreen display, but not the entire width of the display. FIG. 1 is a block diagram of the prior art pillarboxing technique for displaying video content of one aspect ratio on a display with a second, higher aspect ratio. As shown in FIG. 1, the widescreen display 10 contains standard aspect ratio display area 20. The height of the standard aspect ratio display area is the same as the height of widescreen display 10. However, standard aspect ratio display area 20 is narrower than the widescreen display 10. The remaining area on widescreen display 10 are pillarbox areas 30. These areas do not display the standard aspect content. Often these pillarbox areas are blacked out or otherwise filled by content which will not distract a viewer from the content in the standard aspect display area 20.

Figure 2:
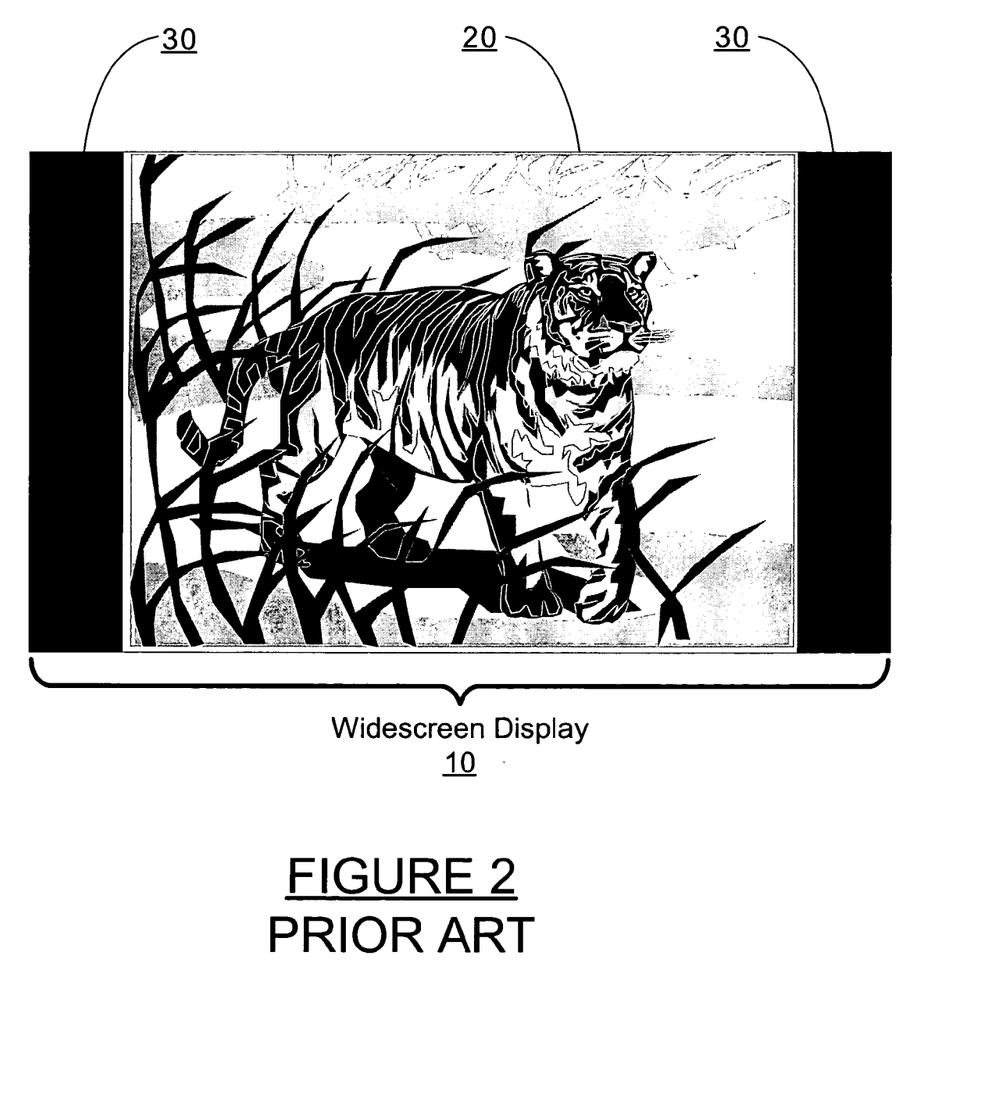
FIG. 2 is a diagram of an example of the use of the prior art pillarboxing technique.

The result of pillarboxing is shown in FIG. 2. FIG. 1 is a diagram of the prior art pillarboxing technique in use. As shown in FIG. 2, pillarboxing areas 30 are the blacked out areas on either side of the standard aspect display area 20. The standard aspect display area 20 is displaying the standard aspect content. This prior art pillarboxing technique has at least two major drawbacks: the first is that a user of a widescreen display 10 may be disappointed that only the standard aspect ratio display area 20 of widescreen display 10 is in use. The second is that some displays, for example some plasma displays, may get a "burn-in" effect from displaying the pillarboxes 30 for extended times. This burn-in may cause a loss in display performance, for example, after extended use of a display using the pillarbox technique, a "shadow" of the pillarboxes may be visible to the user when the entire widescreen display 10 is being used.

Figure 3:
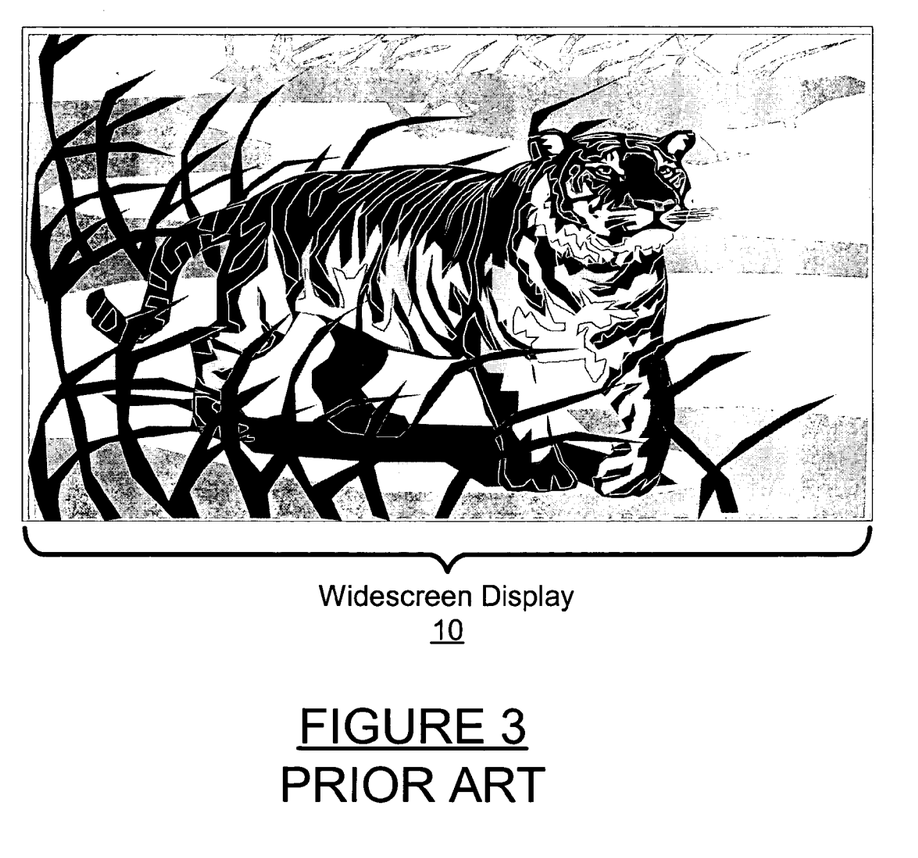
FIG. 3 is a diagram of an example of the use of the prior art uniform stretch-to-fit technique on the image from FIG. 2.

Another prior art technique for displaying video content of one aspect ratio on a display with a different aspect ratio is to stretch the content uniformly over the display. The image is displayed as intended in one dimension (top to bottom) but in the other dimension (side to side) the image is uniformly stretched. In order to display an image, given an aspect ratio (the original aspect ratio of the video content) and a height (the height of the display), an intended width can be calculated. However, because the aspect ratio of the display is different than that of the video content, this intended width would not fill the display. The prior art technique stretches the video content to a width which will fill the entire display. This may be accomplished, for example, using a stretching method in a graphics interface which interfaces with graphics hardware. The stretching may also be accomplished by using a stretching capability in the graphics processing unit itself. Such stretching simply allows for a uniform linear stretch of a rectangular area to fill a greater area. FIG. 3 is a diagram of an example of the use of the prior art uniform stretch-to-fit technique on the image from FIG. 2. In FIG. 3, the entire widescreen display 10 is used to display an image. This uniform stretch technique may also allow a uniform linear shrink to be used if the aspect ratio of the display is smaller than the aspect ratio of the source video content.

Thus, uniform stretching can allow the use of the a display of a different aspect ratio than the source image. However, since the image was originally intended for display on a screen with a lower aspect ratio than the widescreen display 10, the image appears distorted. The image may appear "fat" (where the aspect ratio of the display is higher than that of the source content) or squeezed (where the aspect ratio of the display is lower than that of the source content.) This distortion is one disadvantage of this prior art technique.

In view of the foregoing, there is a need for a system and method that overcomes the drawbacks of the prior art.

SUMMARY OF THE INVENTION

In one embodiment, in order to display a source image of a first aspect ratio on a display destination area of a second aspect ratio, the source image is divided into source image strips. The destination area is also divided into strips—these are destination image strips. There are the same number of source image strips as destination image strips, and each source image strip corresponds to a specific destination image strip. Destination image strips may be of different thicknesses. A destination strip nearer to a focus area (such as the center of the image, in one embodiment) is closer to the aspect ratio of the corresponding source image strip. If the second aspect ratio is narrower than the first aspect ratio, a destination strip farther from a focus area will be of a narrowed aspect ratio compared to the corresponding source image strip. If the second aspect ratio is wider than the first aspect ratio, a destination strip farther from a focus area will be of a widened aspect ratio compared to the corresponding source image strip. Each source image strip is treated as a texture, and texture mapping is used to cover the corresponding destination image strip.

In another embodiment, in order to display a source image of a first aspect ratio on a display destination area of a second aspect ratio, the source image is divided into source image strips. An intermediate destination area of the same aspect ratio is also divided into strips—these are intermediate destination image strips. Intermediate destination image strips may be of different thicknesses. The source image strips are stretched to fill the destination image strips. The intermediate destination area is then stretched uniformly to the second aspect ratio. The sizes of the intermediate destination strip are select so that after this uniform stretch, those intermediate destination strips nearer to a focus area (such as the center of the image, in one embodiment) are closer to the aspect ratio of the corresponding source image strip. If the second aspect ratio is narrower than the first aspect ratio, after the uniform stretch, intermediate destination strips farther from a focus area will be of a narrowed aspect ratio compared to the corresponding source image strip. If the second aspect ratio is wider than the first aspect ratio, intermediate destination strips farther from a focus area will be of a widened aspect ratio compared to the corresponding source image strip.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

In order to modify an image of a first aspect ratio to be displayed in a display area with a second aspect ratio, the aspect ratio of some of the image content is approximately maintained. However, the aspect ratio of other areas of the image content is stretched so that the entire resulting image fills the display area.

In order to accomplish this differential stretching, texture mapping or stretching functions from graphics interface software or on graphics hardware is used. This allows real-time conversion of video content for gaming, movies, and other applications.

Exemplary Computing Environment

Figure 4:
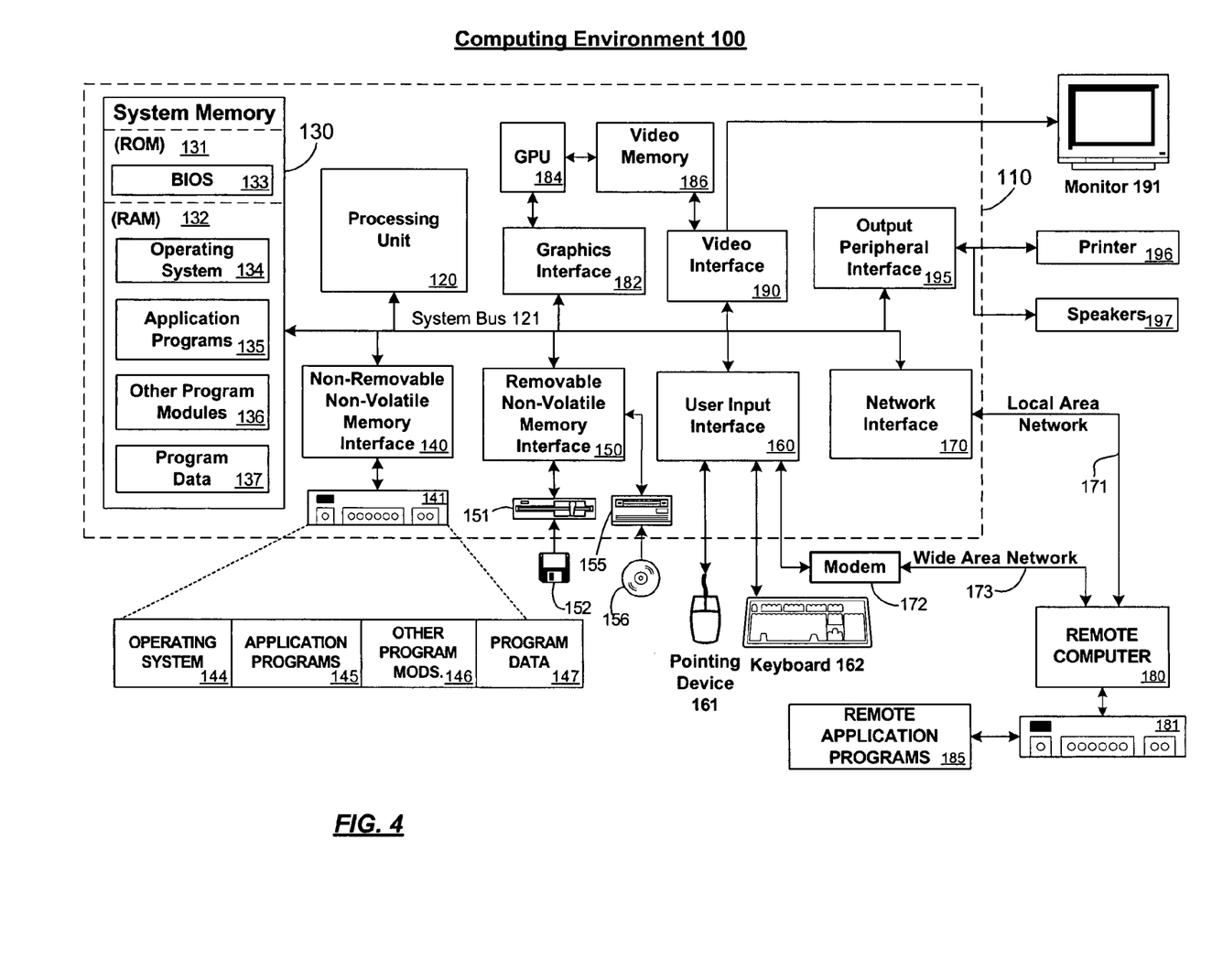
FIG. 4 is a block diagram of an example computing environment in which aspects of the invention may be implemented.

FIG. 4 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

Displaying Video Content on a Display with a Different Aspect Ratio

In order to provide for the display of video content of a first aspect ratio on a display of a higher aspect ratio without the disadvantages of the pillarboxing technique and without the extreme distortion of the uniform stretch to fit technique, a non-linear stretch is applied to the video content.

Figure 5:
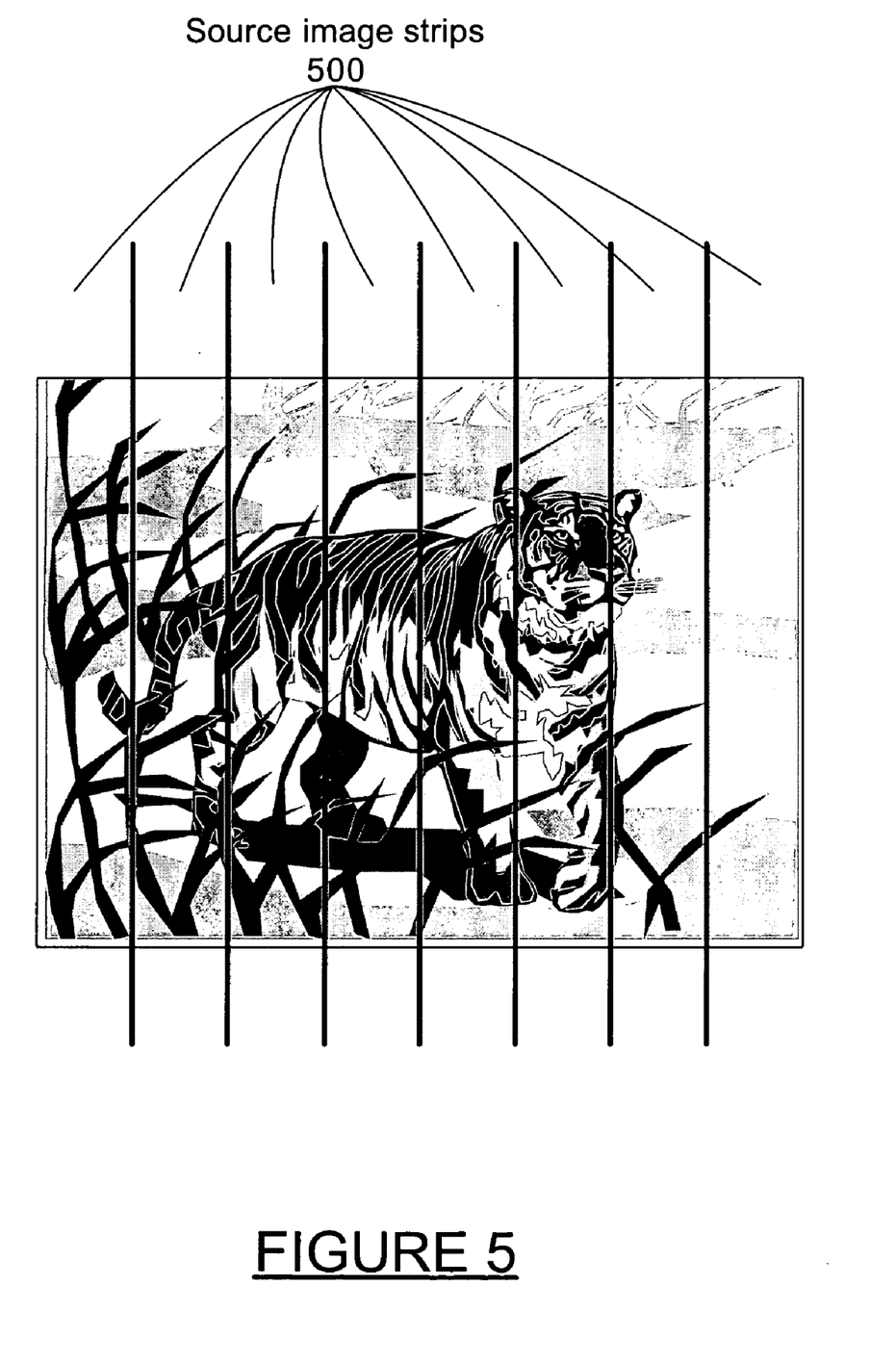
FIG. 5 is a diagram of an image divided into vertical strips according to one embodiment of the invention.

In one embodiment, an image is divided into vertical strips of approximately equal area. FIG. 5 is a diagram of an image divided into vertical strips according to one embodiment of the invention. In FIG. 5, the source image to be displayed at a higher aspect ratio has been divided into vertical areas of equal width, source image strip 500. A non-linear stretch will be applied to the source image by at least stretching some of these source image strips 500. The stretch is a non-linear stretch because at least two of the source image strips 500 are stretched to different extents.

In general, in video content, most of the important detail is in the center of the image. The periphery content to the left and right of the center of the source image is often extraneous to a viewer's focus when viewing the source image, and it is therefore not as important to preserve the aspect ratio in the source image strips 500 which are farther out from the center of the image. Thus, in order to apply a non-linear stretch to the image, the aspect ratio of the source image will be preserved to a greater extent in the source image strips 500 from the center of the source image than in the source image strips 500 located more towards the left and right ends of the source image.

Figure 6:
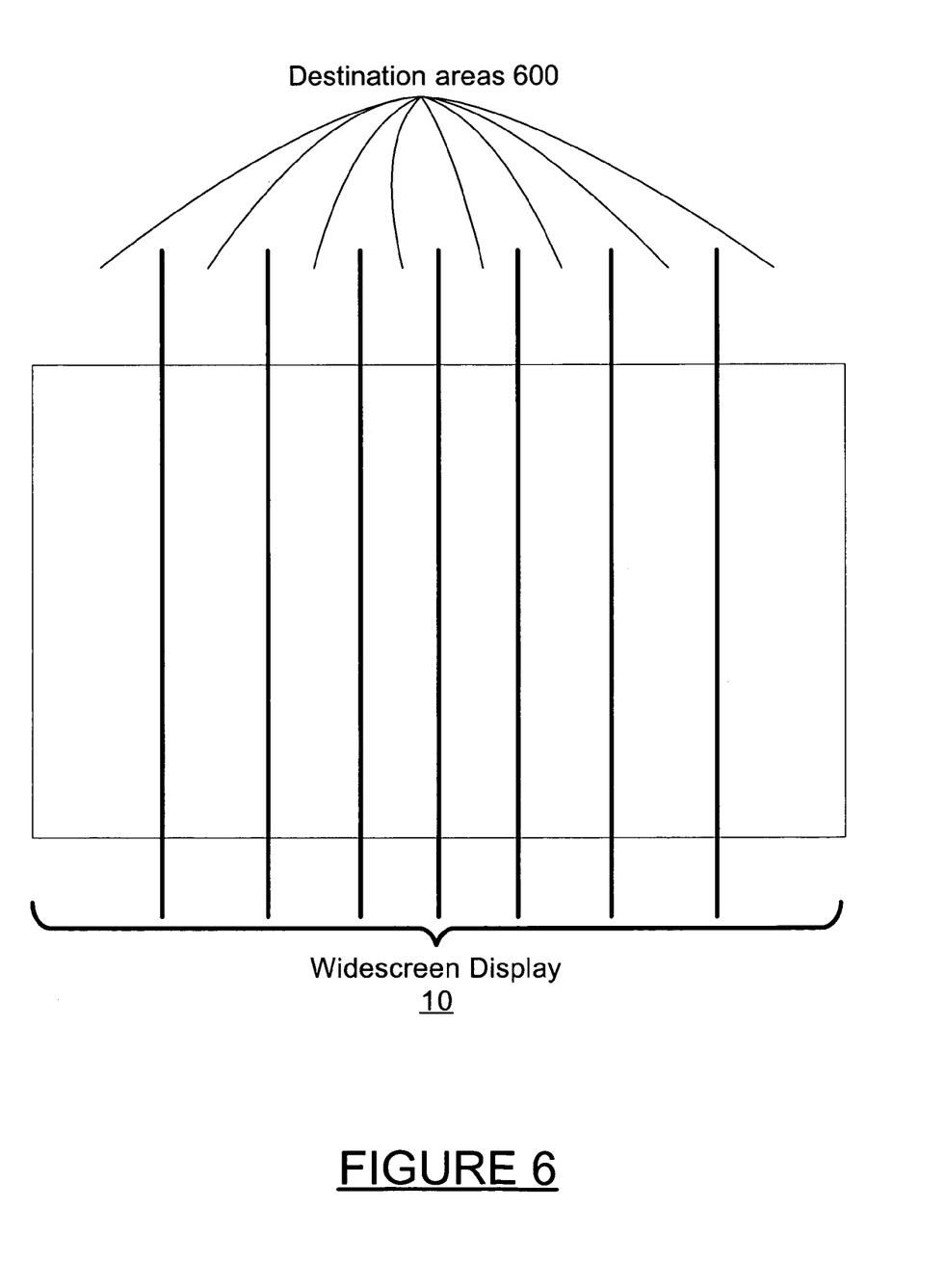
FIG. 6 is a diagram of the destination display area divided into destination areas according to one embodiment of the invention.

FIG. 6 is a diagram of the destination display area divided into destination areas according to one embodiment of the invention. As seen in FIG. 6, in order to display the image from FIG. 5 on the widescreen display 10 of FIG. 6, the widescreen display 10 is divided into vertical strips which are destination areas 600. The number of destination areas is equal to the number of source image strips 500 (from FIG. 5) into which the source image has been divided.

Figure 7:
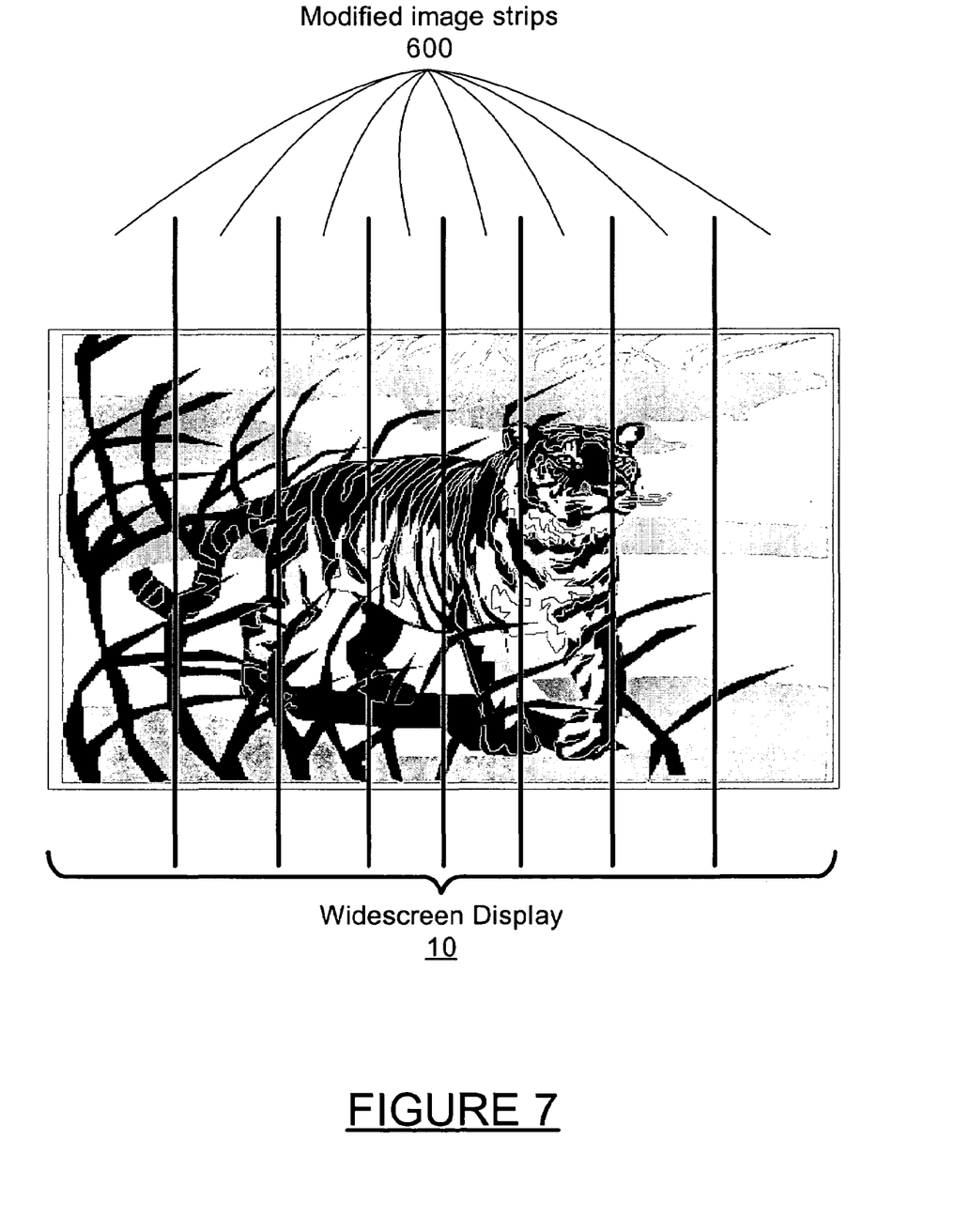
FIG. 7 is a diagram of the destination display area displaying an according to one embodiment of the invention.

The destination areas 600 which are more towards the center of widescreen display 10 preserve the aspect ratio of the source image strips 500 to a greater extent than the destination areas 600 which are located towards the left and right sides of widescreen display 10. In the example shown in FIG. 6, the destination display area (widescreen display 10) has a higher aspect ratio than the original source image. Therefore, destination areas 600 which are located towards the left and right sides of widescreen display 10 are of a higher aspect ratio than the source image strips 500. In one embodiment, where the destination display area has a higher aspect ratio than the source image, the closer the strips are to the sides of the widescreen display 10, the higher their aspect ratio. FIG. 7 is a diagram of the destination display area displaying the image from FIG. 5 on the widescreen display 10 of FIG. 6. The modified image strips 600 have been placed into the destination areas 500 from FIG. 5. Thus the source image from FIG. 5 has been displayed on widescreen display 10 with minimized distortion in the center of the image.

Figure 8:
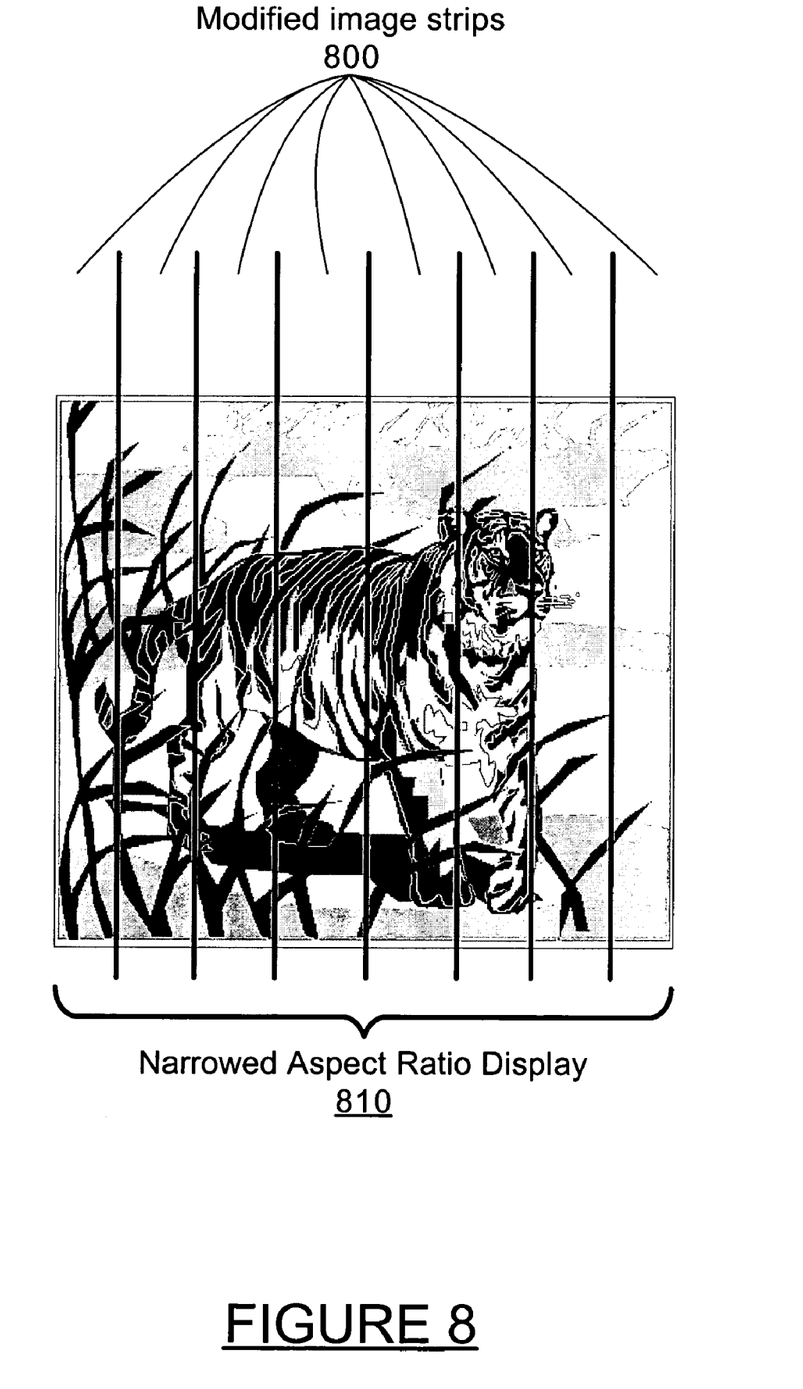
FIG. 8 is a diagram of the source image according to one embodiment of the invention.

In order to display a source image on a destination display of a narrower aspect ratio than the source image, the same technique can be used. Again, as was shown in FIG. 5, the source image is divided into an equal number of source image strips 500. FIG. 8 is a diagram of the source image from FIG. 5 displayed in a display area with a narrower aspect ratio than the source image. As shown in FIG. 8, the narrowed aspect ratio display 810 displays modified image strips 800, each destination image strip 800 corresponding to a source image strip 500 from FIG. 5. The strips from among the modified image strips which are more towards the center of narrowed aspect ratio display 810 are closer to the original aspect ratio of the source image strip 500s. The strips from among image strip 800 which are more towards the edges of the narrowed aspect ratio display 810 have a narrower aspect ratio. Thus the source image from FIG. 5 has been displayed on narrowed aspect ratio display 810 with minimized distortion in the center of the image.

Thus, differential stretching of source image strips 500 is used to display video content of one aspect ratio on a display of a different aspect ratio. In one embodiment, the differential stretching across the strips can be described by a linear equation. In other embodiments, other types of equations or other means can be used to determine the differential stretching across the strips.

In one embodiment, instead of approximately preserving the aspect ratio of the source image in the center of the destination image strips, the aspect ratio of the source image is preserved in one or more focus areas. Thus, if the primary focus of video content is not in the center of the image but to the left of the image, the aspect ratio of the source image can be approximately preserved at the left of the image, allowing more distortion at the right. Or, if the primary focus of video content is in two or more locations, there may be two or more areas in which the aspect ratio of the source image is approximately preserved, with distortion allowed in other areas.

Use of Texture Mapping to Perform Aspect Ratio Conversion of Video Content

In order to provide flexibility in producing graphics, texture mapping is provided in many modern graphics hardware elements, and graphics interface software often provides methods for using texture mapping. In texture mapping images (textures) can be displayed on arbitrary polygonal objects. A texture can be used to cover complex 3D designs, without requiring a the computation of a complex polygonal model.

In texture mapping, the texture is used essentially as a look up table: whenever a pixel in the textured object is to be drawn, a lookup is performed into the texture. The value for the texture at the sampled position is projected onto the object, either directly or through blending with other pixel value for that pixel.

In order to expand or narrow a source image strip 500 to fit in a destination area with a different aspect ratio than the source image strip 500, in one embodiment, texture mapping is used. The source image strip is treated as the texture, and the destination area as the object to which the texture is applied.

In one embodiment, each source image strip 500 is converted into a triangle mesh. The simplest way to do this is to divide each source image strip 500 is a rectangle, and the resultant triangle mesh consists of two triangles for each source image strip 500. It is contemplated that more complex display areas may exist which are not rectangles. In this case, the strips may not be rectangles but may have more complex top and bottom borders; in such cases the triangle mesh may be more complex. Each destination area is similarly divided into a triangle mesh.

Texture mapping is then used to stretch each source area triangle to fit the corresponding destination area triangle. Each of the source image strip 500 triangles is treated as a texture, and the texture for a given source image strip 500 triangle is applied to the corresponding triangle of the destination area. For example, each triangle of source image information may be used as a texture which is then applied to the corresponding triangle in the destination areas. Because texture mapping capabilities are generally found in GPUs such as GPU 184 (from FIG. 4), this allows the processing of the non-linear stretch according to the invention to be handled in the GPU 184, rather than in a non-dedicated processor (such as processing unit 120, from FIG. 4). Use of the GPU 184 allows efficient realization of the non-linear stretch, which in turn allows the non-linear stretch to be performed, for example, on successive frames of a movie being displayed in real time.

Edge correction or filtering may be necessary. In one embodiment, such edge correction or filtering is provided automatically by the graphics card, for example, a graphics card incorporating a GPU 184 and specialized for 3D graphics. In another embodiment, it is provided through graphics interface software which is being used to create the graphics.

Figure 9:
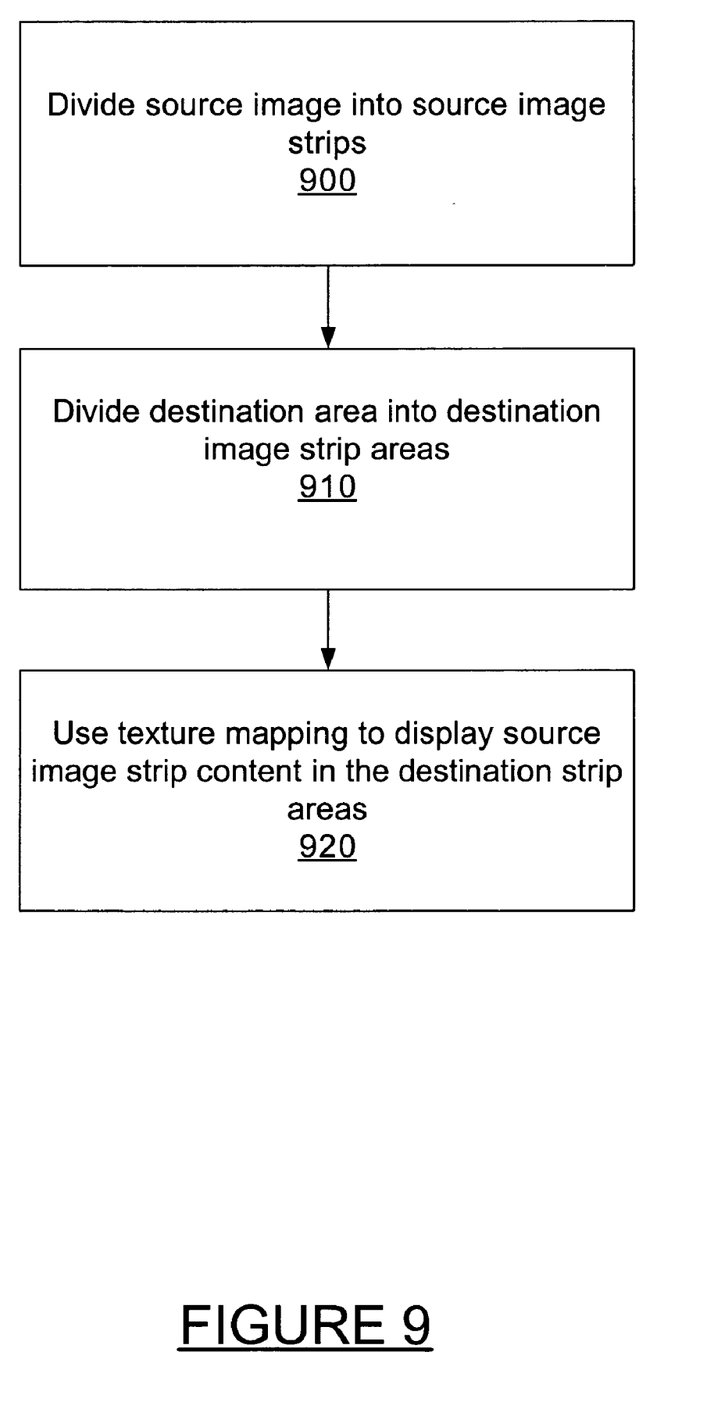
FIG. 9 is a flow diagram of a method displaying a source image of a first aspect ratio in a display area of a second aspect ratio, according to one embodiment of the invention.

FIG. 9 is a flow diagram of a method displaying a source image of a first aspect ratio in a display area of a second aspect ratio, according to one embodiment of the invention. In step 900, the source image is divided into source image strips. In step 910, a destination area is divided into destination image strip areas. These strips are equal in number to the source image strips, and each destination image strip corresponds to a source image strip. The aspect ratio of the corresponding source image strip is preserved in the destination image strip to a greater extent near a focus area, to a lesser extent farther from that focus area. In step 920, texture mapping is used to convert the source image strips for display in the destination strip areas.

Use of Stretching to Perform Aspect Ratio Conversion of Video Content

While the transfer and stretching of source image strips as shown in FIGS. 5–7 may be accomplished as described above, in one embodiment it is performed using an intermediate step. In this intermediate step, the source image is changed "in place"—an intermediate image of the same aspect ratio is produced from the source image. The intermediate image is then uniformly stretched, producing a result which again preserves the aspect ratio for content at the center of the image and allows changes in the aspect ratio towards the left and right of the image.

Figure 10:
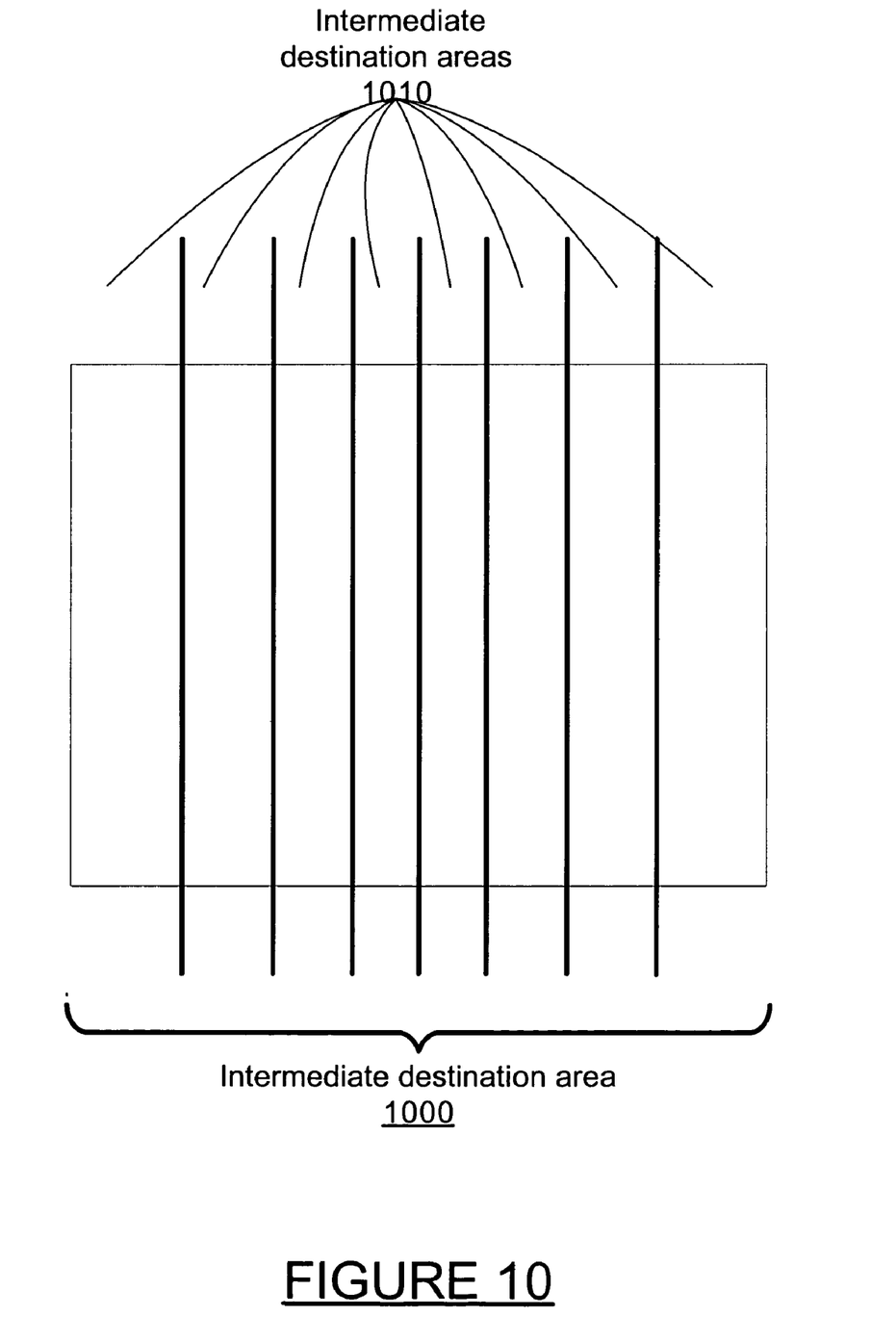
FIG. 10 is a diagram of an intermediate destination area divided into intermediate destination areas according to one embodiment of the invention.

In such an embodiment, in order to convert an image from a source image aspect ratio to a destination area aspect ratio, again the source image is divided into vertical strips of equal area, as shown in FIG. 5. The first destination of each source image strip 500, in this embodiment, is a strip of an intermediate destination area which is the same aspect ratio as the source image area. FIG. 10 is a diagram of an intermediate destination area divided into intermediate destination areas according to one embodiment of the invention. As seen in FIG. 9, the intermediate destination area 1000 is the same aspect ratio as the source image. The intermediate destination area is divided into vertical strips which are intermediate destination areas 1010. The number of intermediate destination areas 1010 is equal to the number of source image strips 500 (from FIG. 5) into which the source image has been divided.

As shown in FIG. 10, where the aspect ratio of the ultimate destination area is wider than the aspect ratio of the source image, the intermediate destination areas 1010 which are more towards the left and right of the intermediate destination area have a relatively larger aspect ratio compared to those strips at the center. If the aspect ratio of the ultimate destination area were to be narrower than the aspect ratio of the source image (not shown), the intermediate destination areas 1010 which are more towards the left and right of the intermediate destination area have a relatively narrower aspect ratio compared to those strips at the center.

As has been described, the intermediate destination image will eventually undergo a linear stretch or shrink in order to be the correct aspect ratio of the final destination. The aspect ratio of the intermediate destination areas 1010 in the center of the image, therefore, are selected in order to provide the minimum distortion after this stretching.

Figure 11:
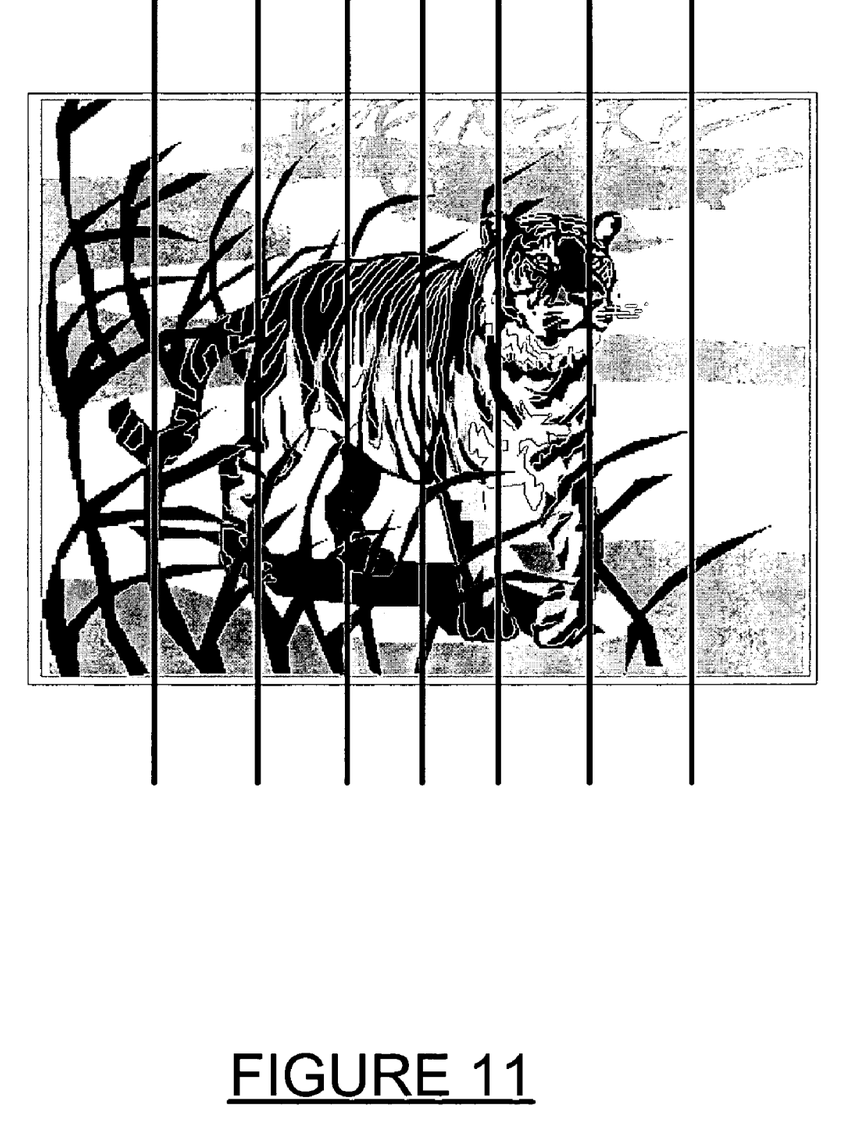
FIG. 11 is an example of an intermediate image according- to one embodiment of the invention.
Figure 12:
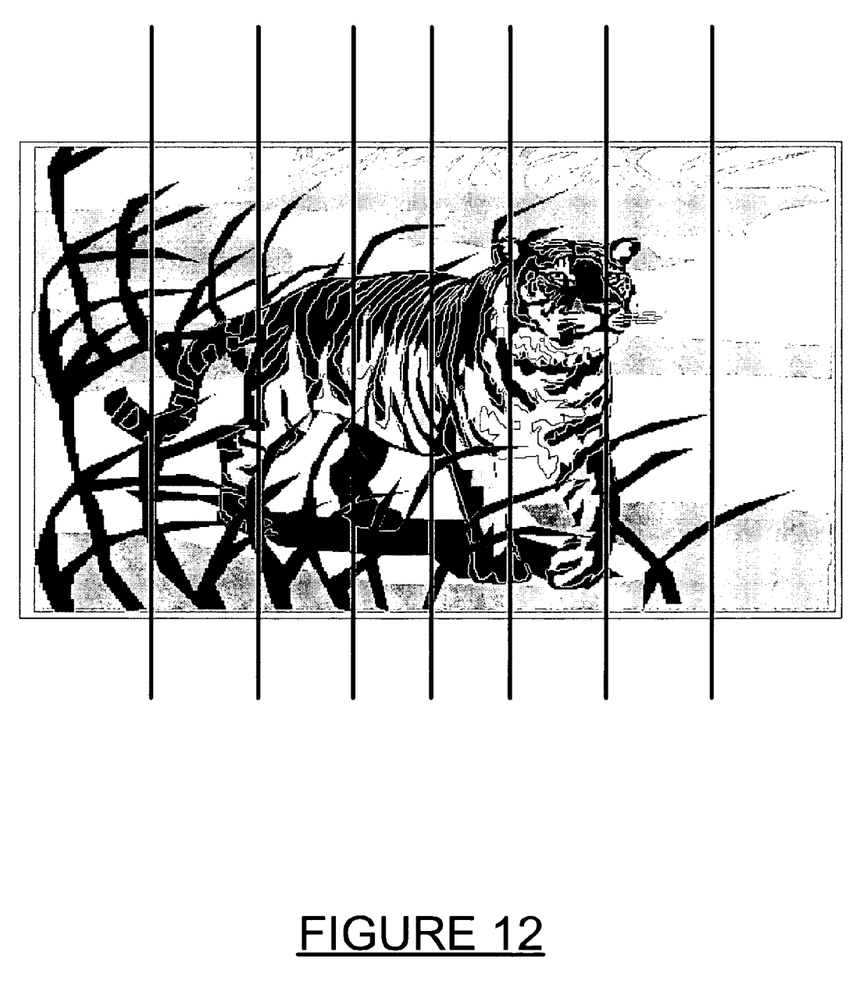
FIG. 12 is an example of a final image according to one embodiment of the invention.

FIG. 11 is an example of an intermediate image according to one embodiment of the invention. FIG. 11 shows the intermediate image after the source image information has been transformed to fit the destination areas 1010 (from FIG. 10). Finally, a linear stretch is applied to the intermediate image as shown in FIG. 11. FIG. 12 is an example of a final image according to one embodiment of the invention. The final image is in the desired aspect ratio.

Thus, again, differential stretching of source image strips 500 is used to display video content of one aspect ratio on a display of a different aspect ratio. In one embodiment, the differential stretching across the strips can be described by a linear equation. In other embodiments, other types of equations or other means can be used to determine the differential stretching across the strips.

As discussed previously, the linear stretch can be done using a stretching method from a graphics API controlling a GPU or in a GPU which performs a linear transformation on an image, for example, the Stretch Rect method.

Figure 13:
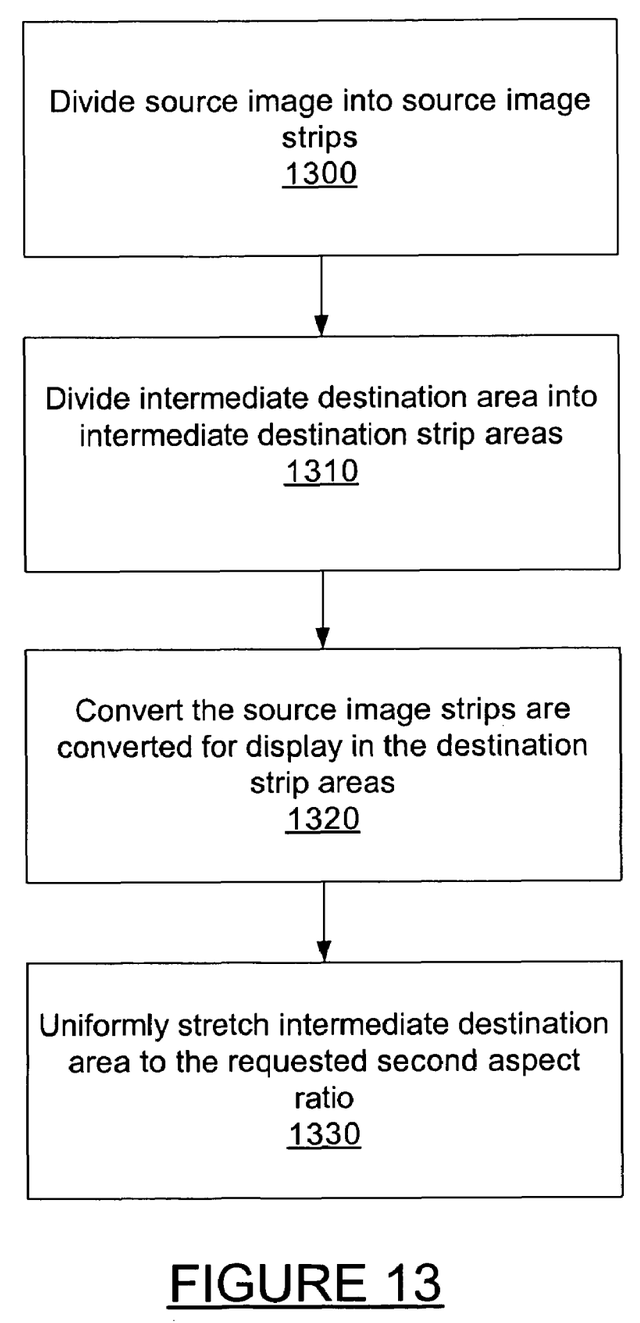
FIG. 13 is a flow diagram of a method displaying a source image of a first aspect ratio in a display area of a second aspect ratio, according to one embodiment of the invention.

FIG. 13 is a flow diagram of a method displaying a source image of a first aspect ratio in a display area of a second aspect ratio, according to one embodiment of the invention. In step 1300, the source image is divided into source image strips. In step 1310, an intermediate destination area is divided into intermediate destination strip areas. These strips are equal in number to the source image strips, and each intermediate destination image strip corresponds to a source image strip. In step 1320, the contents of the source image strips are converted for display in the destination strip areas. In step 1330, a uniform stretch is made of the intermediate destination area to the requested second aspect ratio. The sizes of the intermediate destination strips are set so that after the uniform stretch, the aspect ratio of the corresponding source image strip is preserved in the destination image to a greater extent near a focus area, to a lesser extent farther from that focus area.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for displaying a source image in a display area, where said source image is of a first aspect ratio, and said display area is of a second aspect ratio, comprising:

dividing said source image into at least two source image strips;

dividing a destination area of said second aspect ratio into destination image strip areas, where said destination image strip areas are equivalent in number to said source image strips, where each destination image strip area corresponds to a specific source image strip, and each of where said destination image strip areas nearer to a focus area preserves an aspect ratio of said corresponding source image strip to a greater extent than each of said destination image strip areas farther from said focus area; and using texture mapping to convert each of said source image strips for display in said corresponding destination strip area.

2. The method of claim 1, where said focus area is a center area of said source image.

3. The method of claim 1, where said extent of said preservation of aspect ratio corresponds to a distance of said destination image strip area from said focus area according to a linear equation.

4. The method of claim 1, where said step of using texture mapping to convert each of said source image strips for display in said corresponding destination strip area comprises:
- converting each source image strip to at least one texture;
- for each destination image strip area, applying said at least one texture corresponding to said corresponding source image strip for said destination image strip area to said destination image strip area.

5. The method of claim 4, where said step of using texture mapping further comprises:
- tessellating each source image strip into source areas;
- tessellating each destination image strip area into destination areas, each destination area corresponding to a source area;
- converting each source area to a source area texture;
- applying each of said source area textures to said corresponding destination area.

6. The method of claim 1, where said step of using texture mapping comprises using a texture mapping method of graphics interface software.

7. The method of claim 1, where said step of using texture mapping comprises using a function of a graphics processing unit.

8. A computer-readable medium having stored thereon at least one computer-executable module comprising computer-executable instructions for performing the method of claim 1.

9. A method for displaying a source image in a display area, where said source image is of a first aspect ratio, and said display area is of a second aspect ratio, comprising:
- dividing said source image into at least two source image strips;
- dividing an intermediate destination area into intermediate destination image strip areas, where said intermediate destination image strip areas are equivalent in number to said source image strips, and where each intermediate destination image strip area corresponds to a specific source image strip;
- stretching each of said source image strips to fit said corresponding intermediate destination image strip area; and
- uniformly stretching said intermediate destination area to said second aspect ratio;
- where said intermediate destination image strip areas nearer to a focus area, after said uniform stretch, preserves an aspect ratio of said corresponding source image strip to a greater extent than each of said destination image strip areas farther from said focus area.

10. The method of claim 9, where said focus area is a center area of said source image.

11. The method of claim 9, where said extent of said preservation of aspect ratio corresponds to a distance of said destination image strip area from said focus area according to a linear equation.

12. The method of claim 9, where said step of uniform stretching comprises using a uniform stretching method of graphics interface software.

13. The method of claim 9, where said step of uniform stretching comprises using a uniform stretching function of a graphics processing unit.

14. A computer-readable medium having stored thereon at least one computer-executable module comprising computer-executable instructions for performing the method of claim 9.

15. A system for displaying a source image in a display area on a display, where said source image is of a first aspect ratio, and said display area is of a second aspect ratio, comprising:
- image dividing means for dividing said source image into at least two source image strips;
- destination area dividing means for dividing a destination area of said second aspect ratio into destination image strip areas, where said destination image strip areas are equivalent in number to said source image strips, where each destination image strip area corresponds to a specific source image strip, and each of where said destination image strip areas nearer to a focus area preserves an aspect ratio of said corresponding source image strip to a greater extent than each of said destination image strip areas farther from said focus area; and
- texture mapping means for converting each of said source image strips for display in said corresponding destination strip area.

16. The method of claim 15, where said texture mapping means comprise graphics interface software.

17. The method of claim 15, where said texture mapping means comprise a graphics processing unit.

18. A system for displaying a source image in a display area on a display, where said source image is of a first aspect ratio, and said display area is of a second aspect ratio, comprising:
- source image dividing means for dividing said source image into at least two source image strips;
- intermediate destination area dividing means for dividing an intermediate destination area into intermediate destination image strip areas, where said intermediate destination image strip areas are equivalent in number to said source image strips, and where each intermediate destination image strip area corresponds to a specific source image strip;
- image stretching means for stretching each of said source image strips to fit said corresponding intermediate destination image strip area; and
- uniform stretching means for stretching said intermediate destination area to said second aspect ratio;
- where said intermediate destination image strip areas nearer to a focus area, after said uniform stretch, preserves an aspect ratio of said corresponding source image strip to a greater extent than each of said destination image strip areas farther from said focus area.

19. The method of claim 18, where said uniform stretching means comprise graphics interface software.

20. The method of claim 18, where said uniform stretching means comprise a graphics processing unit.

* * * * *